Feb. 18, 1941.   L. B. PIERCE ET AL   2,232,341
ELECTRICAL TESTING APPARATUS
Filed April 21, 1939   2 Sheets-Sheet 1
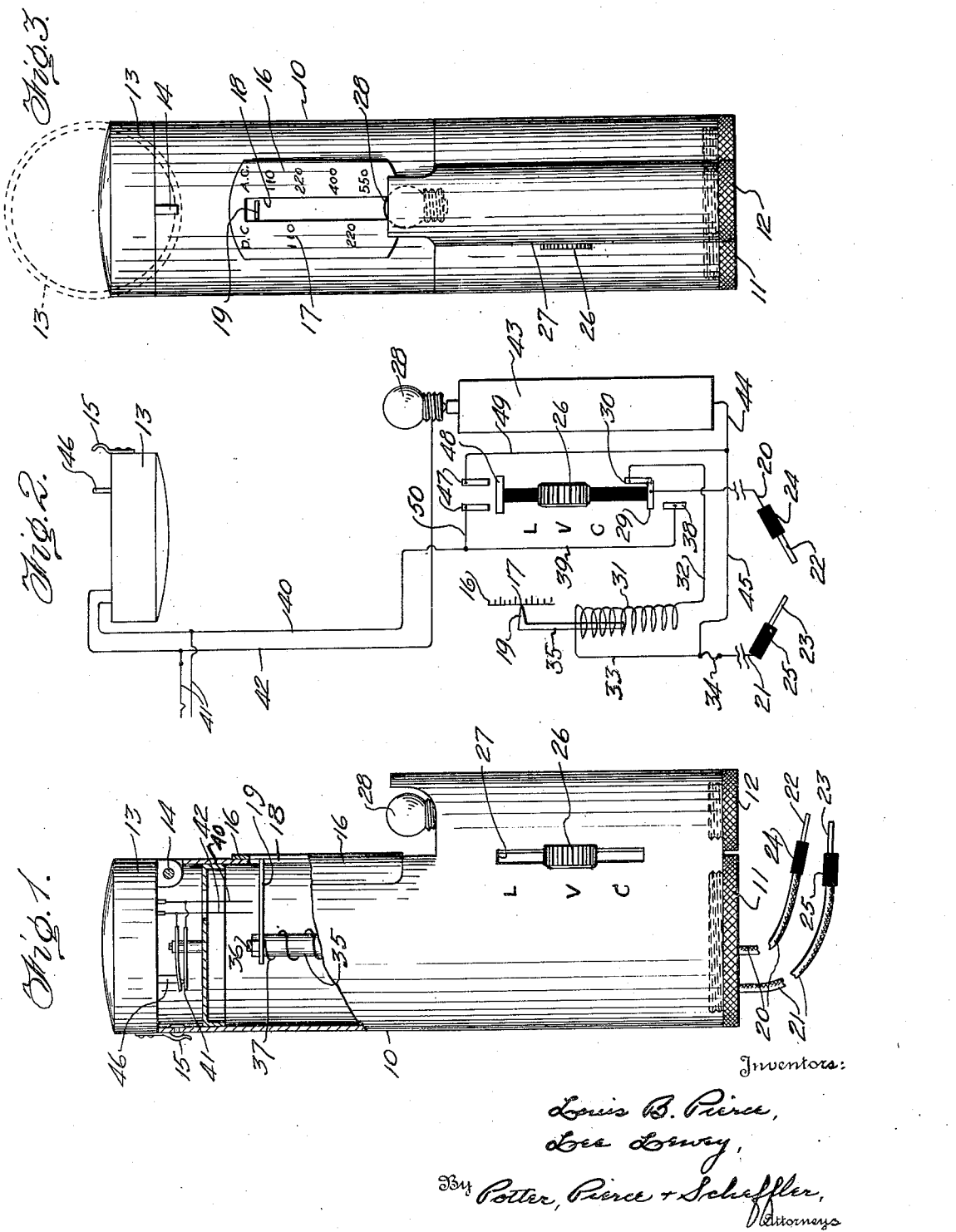
Inventors:
Louis B. Pierce,
Lee Lowry,
By Potter, Pierce + Scheffler,
Attorneys

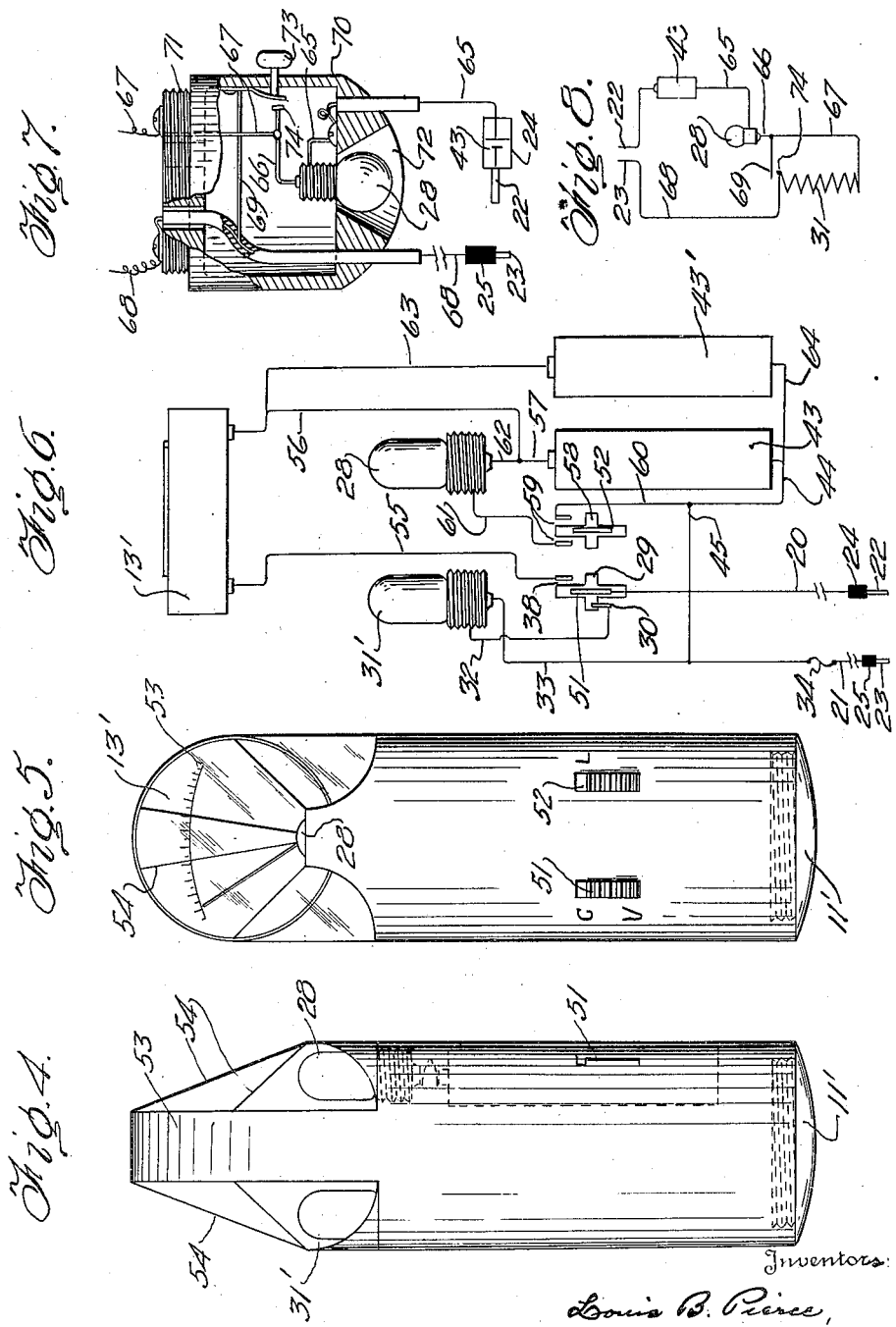

Patented Feb. 18, 1941

2,232,341

UNITED STATES PATENT OFFICE 2,232,341

ELECTRICAL TESTING APPARATUS

Louis B. Pierce and Lee Lewey, Klamath Falls, Oreg.

Application April 21, 1939, Serial No. 269,243

2 Claims. (Cl. 175—183)

This invention relates to electrical testing apparatus and more particularly to combination apparatus for indicating the voltage across different parts of an energized circuit or, alternatively, the continuity of a circuit that is not energized or of a circuit element removed from its normal position in an energized circuit.

Testing apparatus for use in the field should be of simple and rugged construction, and the known solenoid type of voltage indicator meets this requirement but is of limited utility as the power for actuating the voltage indicator is drawn from the circuit under investigation. It is not possible to make a continuity test when the circuit is not energized and circuit elements such as fuses or lamps can not be tested for continuity when removed from the circuit.

An object of this invention is to provide simple, inexpensive and rugged testing apparatus that may be used for either voltage or continuity testing. Objects of the invention are to provide combination testing apparatus including an indicator for voltage measurements, a battery and indicating element for continuity testing, and a switch having alternative positions in which it adapts the apparatus for the desired test operation. A further object is to provide apparatus of the type last stated in which the continuity indicating element is a lamp bulb, and the switch mechanism permits the lighting of the lamp bulb to obtain better illumination during a voltage measurement. More particularly, objects of the invention are to provide combination testing apparatus including a voltage indicator of the solenoid or neon tube type, a self-contained continuity testing system including a battery in circuit with a lamp and a measuring instrument, and switch mechanism for rendering either the voltage indicator or the continuity testing system operative, the switch mechanism being operable to energize the lamp when the voltage indicator is in use.

These and other objects and advantages of the invention will be apparent from the following specification when taken with the accompanying drawings in which:

Fig. 1 is a side elevation, with parts broken away, of a testing device incorporating features of this invention;

Fig. 2 is a schematic wiring diagram of the device;

Fig. 3 is a front elevation of the testing device;

Figs. 4 and 5 are a side and front elevation, respectively, of another embodiment of the invention;

Fig. 6 is a schematic wiring diagram of the same;

Fig. 7 is a longitudinal central section through a unit assembly for converting existing potential testers into combination testing devices; and Fig. 8 is a simplified wiring diagram of a testing device that includes the assembly of Fig. 7.

Considering the drawings in greater detail, an embodiment of the invention, as shown in Fig. 1, comprises a hollow shell or case 10 that is closed at the bottom by a plurality of screw-threaded plugs or caps 11 and 12, and at the top by a meter 13. The meter casing is pivoted to the case 10 by a pin 14 and latched in its normal position by a spring latch 15. The meter itself contains an appropriate scale and relatively movable pointer of accepted construction.

A voltage indicator of the solenoid and plunger type is mounted in the main section of the case 10 and includes the usual scale plate 16 with graduations 17, for direct and alternating current voltages, at opposite sides of a slot 18 in which the end of the pointer 19 moves. The test leads 20, 21 extend through the bottom of the case and terminate in probe electrodes 22, 23, in insulating sleeves 24, 25, respectively. The probe electrodes were permanently connected to opposite terminals of the solenoid, not shown in Fig. 1, in the known voltage indicators but, in accordance with this invention, these connections are controlled manually by a switch mechanism operated by a knob 26 that is slidable in a slot 27. The meter 13 and a lamp bulb 28 form part of the continuity testing system, the lamp bulb being also useful for illumination during voltage tests. Legends or symbols, such as the letters "L," "V" and "C," are placed at one edge of the slot 27 to indicate adjustments of the switch knob 26 to light the lamp 28, and to condition the device for voltage and for continuity tests, respectively.

As shown in Fig. 2, the test lead 20 is connected to the movable contact 29 of the switch 26, this contact engaging the fixed contact 30 when the knob 26 is in its central or upper position. The solenoid 31 is connected to contact 30 by a lead 32 and, through lead 33 and a protective fuse 34, to the test lead 21. The plunger or armature 35 terminates in a threaded stem 36 on which the pointer 19 is mounted, and a coil spring 37 normally retains the plunger in elevated position.

The continuity testing circuits include a fixed contact 38 that is engaged by movable contact 29 when the switch knob 26 is moved to the C position, the contact 38 being connected through leads 39 and 40 to the meter 13. The blades of a spring switch 41 are shunted across lead 40 and the lead 42 from the meter 13 to the lamp bulb 28. The other terminal of the lamp bulb 28 rests on the center electrode of a small flashlight battery 43 that is connected through leads 44, 45 to the fuse 34. A projection or lug 46 on the meter casing 13 engages and closes the switch 41 when the meter 13 is in normal position, as shown in Fig. 1, to shunt out the meter.

The illumination or lighting circuit includes contacts 47 that are bridged by a movable contact 48 when the switch knob 26 is lifted to the L position, the contacts 47 being connected by a lead 49 to the battery lead 44, and by a lead 50 to the lead 40, respectively.

The device is employed in the following manner. For potential measurements under good illumination, the switch knob 26 is moved to its central or V position, as shown in Figs. 1 and 2. This places the solenoid 31 in circuit with the probe electrodes and the voltage indicator functions in the usual manner. The circuit is protected against damage from abnormal voltages by the fuse 34. When illumination is desired for the scale plate 16 or for the application of the probe electrodes 22, 23, to the circuit under test, the switch knob 26 is moved to its upper or L position. This adjustment does not affect the voltage indicator circuit but closes the battery circuit of the bulb 28, the circuit extending from the lower end of battery 43 through leads 44, 49, switch 47, 48, leads 50 and 40, switch 41, lead 42 and the bulb 28.

The switch knob 26 is moved down to close contacts 29, 38 for a continuity test; the meter 13 being still retained in normal closed position over the top of the shell 10. The voltage indicator circuit is now open as contact 29 has moved away from the contact 30. The probe leads 22, 23 are connected in series with lamp 28 and battery 43 through the switch 29, 38, leads 39, 40, switch 41, lead 42, the lamp and battery, leads 44, 45 and fuse 34. If the circuit or circuit element under test is of relatively high resistance, the current flow may not be sufficient to light the lamp bulb 28. Meter 13 is then turned to displace the lug 46, thus permitting the switch 41 to open. The meter 13 is thereby included in the series circuit of battery 43. The current flow through the meter is a function of the total resistance in the series circuit and the scale of the meter 13 may therefore be calibrated in ohms.

In the modification shown in Figs. 4 to 6, inclusive, a neon tube 31' is employed as the potential indicator in place of the solenoid and plunger of the previously described construction. Separate switches 51, 52 are provided for controlling the change from potential to continuity testing, and for controlling illumination during potential tests. The instrument 13' is mounted in fixed position in a transverse plane at the top of the casing 53 of the combination tester. Guard wires or a transparent shield 54 extends from the main body of the shell 53 to protect the instrument 13', the lamp bulb 28 and the neon tube 31' from damage. Those elements of the Fig. 6 circuit that duplicate parts of the Fig. 2 circuit are identified by the corresponding reference numerals but will not be described in detail. The movable contact 29 is displaced between contacts 30, 38 of the voltage and continuity testing circuits by the adjustment of the switch knob 51. Switch contact 38 is connected to instrument 13' by a lead 55, and leads 56, 57 connect the other side of the instrument 13' to the battery 43. The lamp bulb 28 is used only for illumination purposes and may be connected in circuit with the battery 43 through movable contact 58 that is adjusted by knob 52, contacts 59 that are connected to battery lead 44 and bulb 28 through leads 60 and 61, respectively, and a lead 62 from the other lamp bulb terminal to lead 57 of battery 43. If desired, an additional battery 43' may be provided for the continuity testing circuit, the battery 43' being connected to instrument 13' and battery 43 by leads 63 and 64.

The method of operation of this form of the invention will be apparent from an inspection of the circuit diagram and the above description of the Fig. 2 circuit.

A unit assembly for the conversion of the known solenoid-plunger type of voltage indicators into combination devices contemplated by this invention is shown in Fig. 7. The unit takes the form of a screw cap for replacing the usual screw cap through which the probe leads extend from the solenoid of the prior devices. The battery 43 for continuity tests is located in the insulating sleeve 24 in series with the probe electrode 22 and a lead 65 that is connected to one terminal of the lamp bulb 28. Leads 66, 67 connect the other lamp bulb terminal to the solenoid winding 31, Fig. 8, and a lead 68 connects the other side of the solenoid to the probe electrode 23 in its insulating sleeve 25. A jumper 69 connects the lead 68 to the movable contact of a switch on a wall of the cap 70 that has threads 71 for attaching the same to the casing of the known voltage indicators. The cap 70 has a socket or opening in which the lamp bulb 28 is mounted, and a push button 73 is slidably supported on the cap 70 for displacing the contact end of jumper 69 into engagement with a stationary contact 74 that is connected to the lamp bulb 28 through the lead 66. Engagement of lead 69 with contact 74 short circuits the solenoid 31.

The normal open position of switch 69, 74, as shown in Fig. 8, conditions the device for potential indications. Current from the circuit under test passes in series through the battery 43, lamp bulb 28 and the solenoid 31, but the high resistance of the solenoid limits the power circuit current to a low value that does not damage the battery and lamp. The resistance of the solenoid may be of the order of 3750 and 6100 ohms on direct and alternating current, respectively, while the resistance of the battery 43 and lamp 28 may be of the order of 2.5 and 4.5 ohms, respectively, for both direct and alternating current. The resistances of the battery and lamp are negligible in comparison with that of the solenoid and it is apparent that the voltage indications will not be affected by the addition of the battery and lamp to the measuring circuit. Circuit continuity tests may be made by pressing switch button 73 to close the contacts 69, 74, thus short circuiting the solenoid.

The cap construction of Fig. 7 may, of course, be incorporated in a combination testing device during manufacture but it is particularly useful in the conversion of existing voltage testers to combination or double purpose devices.

The several illustrated embodiments are indicative of the wide latitude in the design and construction of combination voltage-continuity testers contemplated by this invention. It is to be understood that the invention is not restricted to the particular constructions herein shown and described as other arrangements may be designed which fall within the spirit of our invention as set forth in the following claims.

We claim:

1. A circuit testing apparatus of the character described comprising a tubular casing, a pair of exploring leads extending from said casing, voltage indicating means and continuity indicating means carried by said casing, switch means carried by said casing for connecting either of said indicating means to said leads, one of said means including a movable indicator responsive to a condition of a circuit tested, a lamp bulb and a current source for said lamp bulb carried by said casing, said lamp bulb being positioned to illuminate said movable indicator, and switch means for energizing said lamp bulb from said current source independently of the connection of said indicating means to said leads.

2. In a circuit testing device, a tubular casing, voltage indicating means and continuity indicating means mounted in said casing, one of said indicating means comprising a dial instrument mounted in an upstanding position at one end of said casing transversely thereof, the other indicating means comprising a lamp bulb mounted in the end of said casing at one side of said dial instrument, an illuminating lamp bulb mounted at the opposite side of said instrument, a current source carried by said casing, exploring leads, and switch means carried by said casing for selectively connecting either of said indicating means to said leads and for energizing said illuminating lamp bulb from said current source independently of the connection of said indicating means to said leads.

LOUIS B. PIERCE.
LEE LEWEY.